Patented Dec. 14, 1926.

1,610,899

UNITED STATES PATENT OFFICE.

ALEXANDER STEWART, OF ROSELLE, NEW JERSEY, ASSIGNOR TO C. L. CONSTANT COMPANY, OF HOBOKEN, NEW JERSEY, A CORPORATION OF NEW JERSEY.

RECOVERY OF INGREDIENTS OF WASTE LEAD-BATTERY PASTE.

No Drawing. Application filed October 10, 1925. Serial No. 61,837.

The invention relates to a novel method of treating the waste parts of lead battery plates to recover therefrom the valuable metal ingredients such as lead and antimony, the same being recoverable in various forms depending on the particular variation in the method of treatment employed. As generally obtained, ordinary waste battery paste comprises lead peroxide ($PbO_2$), lead sulphate ($PbSO_4$) and small amounts of antimony, usually from ½ to 3%, together with foreign organic matter such as wood and rubber. The paste may be obtained in any suitable manner from scrap battery plates, being separated from the plates and then treated in bulk in manner hereinafter set forth to obtain from same, in pure form, lead sulphate or other suitable salts of the lead content and antimony chloride or other salt of antimony.

To this end, the invention comprises an initial fusion of the waste paste material with an excess of the sulphate of an alkali metal, preferably an acid salt, for example, nitre cake ($NaHSO_4$), which has been found particularly suitable for the purpose. Four parts by weight of the paste material may be melted with three parts by weight of the nitre cake, the operation being carried on at a dull red heat or approximately 200° C. above the fusion temperature of the reagent. The fusion may be carried on in a suitable furnace, crucible or pot (not shown) and the paste may be mixed with the sulphate reagent either before the introduction thereof into the furnace or after the sulphate salt has first been fused. The fusion is continued until all the lead present is converted into a sulphate, the reactions taking place being substantially as follows—

$2NaHSO_4 + PbO_2 =$
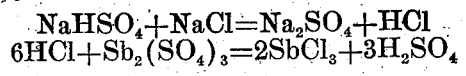
$PbSO_4 + Na_2SO_4 + H_2O + O.$

The water, of course, together with the free oxygen is driven off, and the organic matter oxidized and consumed.

After the fusion has continued sufficiently long, to convert all the lead into a sulphate, the fused mass is poured, in molten condition, into a cold aqueous solution of a mixture of a sulphate of an alkali metal, preferably an acid salt, and a suitable chloride as sodium chloride or hydrochloric acid; or, the fused mass may be spray-cooled by well-known methods, in which case the resulting powder product is to be treated in a hot solution of the sulphate and the sodium chloride and must be maintained sufficiently hot and thoroughly agitated so that the water will dissolve all of the normal alkali sulphate which was formed by the fusion as well as to convert all of the antimony (after fusion in the form of a sulphate) to a soluble chloride, the reactions being substantially as follows—

$NaHSO_4 + NaCl = Na_2SO_4 + HCl$
$6HCl + Sb_2(SO_4)_3 = 2SbCl_3 + 3H_2SO_4$ I have found that with 500 lbs. of the acid sulphate and 200 to 400 lbs. of the sodium chloride to a ton of water all of the antimony will be converted to the chloride and that practically none of the lead sulphate will go into solution. It is, furthermore, desirable to thoroughly agitate the mixture of the fused material with the aforesaid solution and this may readily be accomplished by injecting steam therein, as is well understood.

After the reactions have been fully accomplished, the agitation is stopped and the lead sulphate is allowed to settle, whereupon the supernatant liquor is decanted. This liquor contains the major portion of the antimony which was contained in the paste, the same being in the form of the chloride ($SbCl_3$); and from which metallic antimony may be recovered by any of the usual treatments, such as precipitation upon metallic iron or by treatment with sulphuretted hydrogen or an alkaline sulphide.

The lead sulphate remaining after removal of the solution by decantation is to be thoroughly washed a number of times, preferably by decantation, using small amounts of sulphate or acid sulphate and sodium chloride in the wash water to prevent, first, re-solution of the lead sulphate and, secondly, reprecipitation of any residual antimony as oxychloride. It is desirable in the washings for elimination of sulphate salts and antimony, that all solutions be kept as hot as possible until the washing is completed. Moreover, in the freeing of the lead sulphate from any residual antimony, it is found that at times the operation is assisted by the addition to the wash solution of 3% of one of the following compounds: glucose, sugar, glycerine, tartaric acid or citric acid. It will be understood, of course, that the use of these agents is not essential although they serve materially to prevent precipitation of antimony as an oxychloride but which generally should not take place if the washings are maintained at the proper temperature.

The pure lead sulphate thus obtained may be subjected to further treatment to convert the same into any desired salt; for example, it may be digested with a suitable carbonate as sodium carbonate under suitable agitation and at proper temperatures until all the sulphate of the lead compound has been converted into carbonate, according to the following reaction—

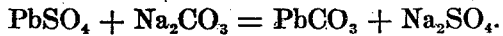

$$PbSO_4 + Na_2CO_3 = PbCO_3 + Na_2SO_4.$$

The lead carbonate is allowed to settle and the supernatant liquor then decanted, whereupon the residue may be washed a number of times by decantation, using small amounts of ammonium carbonate to displace any alkaline salts which may adhere to the carbonate of lead. After filtering and drying by any of the usual methods, the lead salt is ready for the market, or may be further converted into litharge, red lead or any other desired lead salt by any of the usual processes in common use. It is to be noted, also, that in the treatment with a carbonate such impurities as silica, and with the sulphate of an alkali metal such impurities as copper, iron, tin, maganese, etc. which may have originally been present with the waste lead paste, are to a large degree if not entirely eliminated and a particularly pure lead product obtained.

I claim:—

1. The method of treating waste lead battery paste, which comprises fusing the same with an acid salt of an alkali metal.

2. The method of treating waste lead battery paste, which comprises fusing the same with sodium acid sulphate.

3. The method of treating waste lead battery paste, which comprises fusing four parts of the paste with three parts of acid sodium sulphate at a dull red heat.

4. The method of treating waste lead battery paste, which comprises fusing four parts of the paste with three parts of acid sodium sulphate at a dull red heat, and then treating the mass with an aqueous solution of a sulphate of an alkali metal and a chloride of a metal that does not form an insoluble sulphate.

5. The method of treating waste lead battery paste, which comprises fusing the same with a sulphate of an alkali metal and discharging the molten mass into a cold aqueous solution of sodium acid sulphate and sodium chloride.

6. The method of treating waste lead battery paste, which comprises fusing the same with a sulphate of an alkali metal, discharging the molten mass into a cold aqueous solution of sodium acid sulphate and sodium chloride, decanting the supernatant liquor and washing the residue to free the same from any residual antimony.

7. In the treatment of waste lead battery paste, the method of separating antimony from the lead, which comprises treating a sulphate of the latter with an aqueous solution of a sulphate of an alkali metal and a chloride of a metal that does not form an insoluble sulphate.

8. In the treatment of waste lead battery paste, the method of separating antimony from the lead, which comprises treating a sulphate of the latter with a solution of sodium acid sulphate and sodium chloride.

In testimony whereof I affix my signature.

ALEXANDER STEWART.